United States Patent [19]
Toshimitsu et al.

[11] 3,920,797
[45] Nov. 18, 1975

[54] PHOSPHORIC ACID PURIFICATION

[75] Inventors: Itaru Toshimitsu; Sakumi Fujii; Taketoshi Nakajima, all of Shin-nanyo, Japan

[73] Assignee: Toyo Sodo Manufacturing Co., Ltd., Japan

[22] Filed: Mar. 21, 1973

[21] Appl. No.: 343,430

[30] Foreign Application Priority Data
June 10, 1972  Japan................. 47-58008

[52] U.S. Cl. ............................................ 423/321
[51] Int. Cl.² ...................................... C01B 25/16
[58] Field of Search .......... 423/100, 109, 321, 320, 423/319, 321 S

[56] References Cited
UNITED STATES PATENTS

| | | | |
|---|---|---|---|
| 2,955,918 | 10/1960 | Rughrwin.................... | 423/321 |
| 3,310,374 | 3/1967 | Posey et al..................... | 423/321 |
| 3,441,372 | 4/1969 | Pegler et al.................... | 423/100 |
| 3,595,613 | 7/1971 | Klingelhoefer................. | 423/320 |
| 3,723,606 | 3/1973 | Klingelhoefer et al. ......... | 423/321 |

*Primary Examiner*—Herbert T. Carter
*Assistant Examiner*—Eugene T. Wheelock
*Attorney, Agent, or Firm*—Oblon, Fisher, Spivak, McClelland & Maier

[57] ABSTRACT

A process for purifying a phosphoric acid solution containing zinc compound impurities obtained by a wet process method which comprises contacting crude phosphoric acid with a partially water miscible solvent in an extraction battery so as to yield a phosphoric acid containing solvent phase with a chloride ion concentration of 0.2 – 10 g/l; contacting the resulting phosphoric acid containing solvent phase with an aqueous phosphoric acid solution containing 20 – 0.01 g/l chloride ion in a purification battery in amounts from 0.03 – 0.3 times the aqueous phosphoric acid solution compared to the phosphoric acid containing solvent in order to substantially transfer impurities from the solvent phase to the aqueous solution; back-extracting the extracted phosphoric acid containing solvent phase in a washing (recovering) battery so as to obtain a purified phosphoric acid; and removing zinc compounds from the aqueous phosphoric acid solution.

10 Claims, 2 Drawing Figures

PHOSPHORIC ACID PURIFICATION

BACKGROUND OF THE INVENTION

1. Field of the Invention

This invention relates to a process for purifying a crude aqueous phosphoric acid solution. More particularly, it relates to a process for purifying a crude aqueous phosphoric acid solution contaminated with zinc compounds.

2. Description of the Prior Art

Phosphoric acid has been prepared by wet process treatments which involve the extraction of phosphate rocks with sulfuric acid, hydrochloric acid, nitric acid or the like, or by a dry process by heating a phosphate rock with silica and coke. The phosphate rock contains various impurities so that the phosphoric acid produced from the phosphate rock is contaminated with the impurities.

The wet process for producing phosphoric acid is very economical, but the product contains relatively large amounts of the impurities. Accordingly, the product has been mainly used for the preparation of fertilizers. Rarely has it been purified for use in the preparation of foods, pharmaceuticals and chemicals.

On the other hand, the phosphoric acid prepared by the dry process has a relatively high purity. However, for some uses further purification has been necessary because of the contamination by small amounts of impurities.

Recently, various processes have been proposed for the purification of phosphoric acid by extracting the phosphoric acid with an organic solvent such as an aliphatic alcohol, e.g. n-butanol, isobutanol, isoamyl alcohol or cyclohexanol; a trialkyl phosphate, e.g. tributyl phosphate; or a ketone, and the like, and then conducting a back-extraction of the phosphoric acid with water. The efficiency of the solvent for the extraction of phosphoric acid in these methods has been low. Thus, a need exists for an effective method of extraction of crude phosphoric acid and a method for purifying the phosphoric acid with the organic solvent. In the process for purifying the phosphoric acid, all impurities, especially zinc compounds, must be removed.

SUMMARY OF THE INVENTION

Accordingly, one object of this invention is to provide a process for purifying crude phosphoric acid contaminated with impurities such as zinc compounds which are difficult to remove.

It is another object of this invention to provide a process for purifying crude phosphoric acid in order to obtain phosphoric acid pure enough for use in the preparation of foods, pharmaceuticals and pure chemicals, and whose purity is higher than that required for the preparation of fertilizers.

Briefly, these objects and other objects of this invention, as hereinafter will become apparent, can be attained by a process for for purifying crude phosphoric acid prepared by the wet process for treating phosphate rocks with a strong acid, which comprises extracting the crude phosphoric acid with an organic solvent having a limited water solubility in a plurality of contacting zones such as in mixer-settlers or on plates of the extraction battery, washing the solvent containing phosphoric acid (hereinafter referred to as the $H_3PO_4$-solvent mixture) from said extraction battery with phosphoric acid having a low concentration of chloride ions, in the purification battery, contacting a portion of the aqueous phosphoric acid solution in the extraction battery or the purification battery with a solvent in the impurity stripping battery, recycling the $H_3PO_4$-solvent from the impurity stripping battery and the aqueous phosphoric acid solution from the purification battery to the extraction battery, and backextracting the $H_3PO_4$-solvent mixture from the purification battery with water.

DESCRIPTION OF THE PREFERRED EMBODIMENTS

Figure 1:
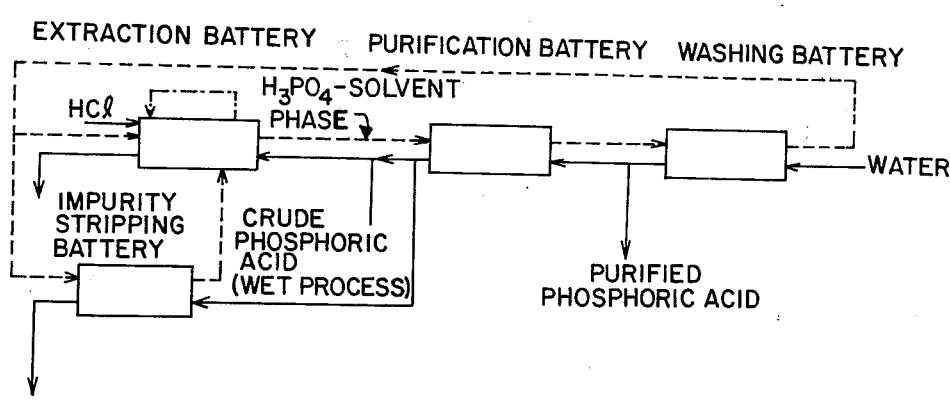
FIG. 1 is a block schematic diagram of one embodiment of the system for the purification of phosphoric acid according to this invention.

FIG. 1 is a typical flow-sheet diagram of the principal embodiment of the process for the purification of phosphoric acid prepared by the wet process method by solvent extraction. A mixture of a crude phosphoric acid prepared by the wet process method, and a phosphoric acid, containing impurities, obtained from a purification battery, is admitted to one end of the extraction battery.

A mixture of a solvent conducted from the washing (recovering) battery and a small amount of hydrochloric acid, is supplied to the opposite end of the extraction battery, so as to counter-currently contact both mixtures in the plural stages (mixer-settlers) of the extraction battery.

In order to prevent contamination by zinc compounds in the purified phosphoric acid, a portion of the aqueous phosphoric acid solution containing impurities conducted from the purification battery is admitted to the impurity stripping battery, wherein only phosphoric acid is recovered along with a portion of the solvent conducted from the washing battery. The resulting $H_3PO_4$-solvent mixture is conducted to suitable portions of the extraction battery. Instead of employing the impurity stripping battery, it is possible to recycle a portion of the solvent in the extraction battery or the purification battery to the solvent inlet of the extraction battery.

In the extraction battery, the concentration of chloride ions contained in the $H_3PO_4$-solvent mixture conducted from the battery is preferably in the range of 0.2 – 10 g/l, especially 1.5 – 3.5 g/l.

If the concentration of chloride ions in the solvent in the extraction battery is high, the partition coefficient of phosphoric acid in the solvent increases. However the impurities cannot be easily removed in the purification battery. Accordingly, the $H_3PO_4$-solvent mixture is treated to remove hydrochloric acid so that it contains less than 10 g/l of chloride ions by extraction or other methods. Before admitting the $H_3PO_4$-solvent mixture to the purification battery, the concentration of chloride ions in the mixture can be easily controlled by adding hydrochloric acid.

The concentration of crude phosphoric acid is usually in the range of 25 – 54% by weight of $P_2O_5$.

Figure 2:
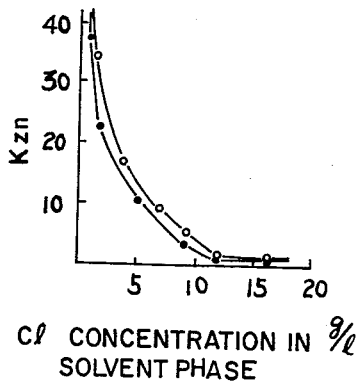
FIG. 2 is a graph of the Zn partition coefficient relative to the chloride ion concentration in the solvent phase.
Figure 3:
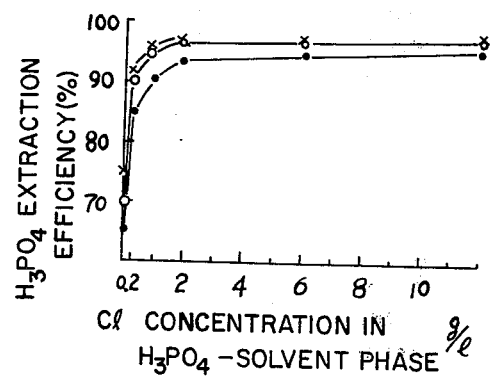
FIG. 3 is a graph of the phosphoric acid extraction efficiency relative to the chloride ion concentration in the extraction battery.

In order to show the basic limitation of chloride ion, the data from certain tests are shown in FIGS. 2 and 3.

FIG. 2 is a graph of the Zn partition coefficient versus the chloride ion concentration in the solvent phase, wherein the Zn partition coefficient $$K_{Zn} = \frac{Zn \text{ concentration in aqueous } H_3PO_4 \text{ sol. (mg/l)}}{Zn \text{ concentration in solvent phase (mg/l)}}$$

is shown on the ordinate and the $Cl^-$ concentration in the solvent phase (g/l) is shown on the abcissa. Each one of several 100 ml samples of an aqueous phosphoric acid solution containing 21.5% or 38.1% by weight $P_2O_5$ which also contain 960 mg/l of zinc ion, is admixed with 100 ml of n-butanol and a small specific amount of hydrochloric acid. The mixture is shaken, and allowed to separate into two phases. The Zn concentration in each phase and the $Cl^-$ concentration in the solvent phase is measured. As shown in the graph, the Zn partition coefficient $K_{Zn}$ is low when the $Cl^-$ concentration in the solvent phase is high. When the $Cl^-$ concentration is less than 10 g/l, the Zn partition coefficient $K_{Zn}$ is sufficiently high. A similar result is found when tributyl phosphate or iso-amyl alcohol is employed as the solvent instead of n-butanol.

FIG. 3 is a graph of the phosphoric acid extraction efficiency of n-butanol versus the $Cl^-$ concentration in the extraction battery. Each one of three samples of the crude phosphoric acid solution containing 26%, 33% and 42% of $P_2O_5$ is extracted with a watersaturated n-butanol solution at the rate of 1:5 by volume, in a 17 stage counter-current extraction process. Various amounts of hydrochloric acid are added to the n-butanol inlet.

In FIG. 3, the $Cl^-$ concentration in the resulting $H_3PO_4$-solvent phase is shown on the horizontal line. The $H_3PO_4$-extraction efficiency $$\frac{H_3PO_4 \text{ in } H_3PO_4\text{-solvent phase [g]}}{H_3PO_4 \text{ in the crude phosphoric acid [g]}} \times 100$$

is shown on the ordinate. When the $Cl^-$ concentration is lower than 0.2 g/l, the $H_3PO_4$ extraction efficiency remarkably decreases. A similar result is found when tributyl phosphate or iso-amyl alcohol is employed instead of n-butanol.

The organic solvent used in the extraction process in this invention can be any one of a series of solvents capable of extracting phosphoric acid which have a limited water solubility, but may be separated from a water phase. The organic solvent can selectively extract phosphoric acid from the crude aqueous phosphoric acid solution. Suitable solvents include aliphatic alcohols such as cyclohexanol, isoamyl alcohol, n-butanol, and isobutanol (ethanol, methanol not included); alkyl phosphates such as tributyl phosphate; certain ketones, esters and ethers.

In order to increase the efficiency of the solvent, the solvent recovered from the back-extraction of the pure $H_3PO_4$-solvent mixture conducted from the purification battery is washed with water in the washing battery, and the solvent can be recycled to the extraction battery and the impurity stripping battery, as shown in FIG. 1. The solvent conducted from the batteries, can be recovered by distillation which remarkably reduces loss of solvent.

The amount of solvent, the type of extraction battery, and the type of solvent are all selected depending upon the concentration of the crude phosphoric acid, the flow rate of the phosphoric acid to the solvent, and the method of admixing the phosphoric acid with the solvent. The type of multi-stage extractor selected, in order to admix the phosphoric acid solution with the solvent in a counter current extraction method, depends upon sufficient liquid-liquid contact.

It is preferable to employ a plurality of mixer-settlers which inject a gas such as air in order to agitate a mixture of the phosphoric acid and the solvent. A differential contactor such as a perforated plates tower is used as the extraction battery. In the extraction process, the amount of solvent employed usually ranges from 0.5 – 50 times by volume, preferably 3 – 20 times by volume, to the volume of total amount of the crude phosphoric acid and the aqueous phosphoric acid solution obtained in the purification battery. The prefered extraction battery is especially a counter current multi-state extractor having 3 – 100 stages, preferably 10 – 20 stages, or the corresponding extraction tower.

The temperature selected for the extraction of phosphoric acid by the solvent depends upon the rate of phase separation and the partition coefficient of phosphoric acid to the solvent. Usually it can be room temperature. In the extraction process, it is required to add hydrochloric acid. The hydrochloric acid can be added to the crude phosphoric acid or the solvent or in a middle stage of the multi-stage extractor. In the upper region of the extraction battery, phosphoric acid containing solvent is contacted with an aqueous phosphoric acid solution in the presence of hydrochloric acid. In the lower region of the battery, phosphoric acid containing solvent is contacted with an aqueous phosphoric acid solution. This results in a gradual increase in the concentration of phosphoric acid in the solvent. Accordingly, optimum results may be obtained from the viewpoint of the partition coefficient of phosphoric acid versus the solvent. Optimum extraction efficiency can be obtained by considering the increase in the phosphoric acid extraction efficiency by the solvent in the presence of hydrochloric acid, and the relation of the concentration of phosphoric acid in the aqueous solution and the organic solvent solution. Solvent phase containing less than 10 g/l of chloride ions is added to the purification battery. Removal of hydrochloric acid can be easily conducted by any desirable method.

In the purification battery, the solvent containing phosphoric acid is counter currently mixed with 0.03 – 0.3 times by volume of a phosphoric acid aqueous solution containing less than 20 g/l of chloride ions to remove most of the impurities from the solvent phase to the water phase. When the amount of aqueous phosphoric acid solution added for counter current contact is less than 0.03 times by volume than the solvent phase, or the concentration of chloride ions in the aqueous solution is more than 20 g/l, it is difficult to completely remove the zinc compounds because of the partition coefficient and the higher chloride concentration. It is unnecessary to use more than 0.3 times by volume of the aqueous phosphoric acid solution compared to the solvent phase, and the loss of phosphoric acid is disadvantageously increased. It is preferable to use a pure phosphoric acid containing 10 – 45% by weight $P_2O_5$.

In order to provide 20 – 0.01 g/l of the chloride ions in the aqueous phosphoric acid solution, the aqueous phosphoric acid solution is produced by back-extracting the $H_3PO_4$-solvent mixture in accordance with this invention. The phosphoric acid containing a high concentration of hydrochloride acid is concentrated by heating to remove hydrochloric acid, and is diluted to any desirable concentration.

It is not always necessary to use a multi-stage purification battery. Preferably, a counter current multi-stage containing apparatus having 5 - 30 stages is used. The contacting apparatus can be the same as the extraction battery.

In the extraction battery, most of the zinc compound in the crude phosphoric acid is removed to the solvent phase containing phosphoric acid. On the other hand, in the purification battery, most of the zinc compound is removed from the solvent phase to the aqueous phosphoric acid solution. This is the reason why the partition coefficient of the zinc compound can be controlled by the concentration of chloride ions compared to the concentration of phosphoric acid. The $H_3PO_4$-solvent mixture produced in the purification battery, is back-extracted by a conventional process with water or an aqueous alkaline solution so that an aqueous phosphoric acid solution or an alkali phosphate solution is obtained and the solvent is recovered. The recovered solvent is saturated with water, and it can be used with or without purification by distillation in the extraction battery or the impurity stripping battery.

A portion of the resulting phosphoric acid or aqueous alkali phosphate solution can be used in the purification battery. A small amount of hydrochloric acid is incorporated in the aqueous solution. The hydrochloric acid can be removed by heating, if required. The aqueous phosphoric acid solution passes from the purification battery contains phosphoric acid together with the impurities. This can be used as a stock material for the fertilizers, but it can be recovered to increase the yield of phosphoric acid. However, when all of the aqueous phosphoric acid solution discharged from the purification battery is recycled to the extraction battery, zinc compounds are accumulated and concentrated in the extraction battery and the purification battery.

In order to overcome some disadvantages and to recover phosphoric acid, all of the aqueous phosphoric acid solution discharged from the purification battery is recycled to the extraction battery, and a portion of the aqueous solution in the extraction battery is mixed with a solvent in the impurity stripping battery. It is also possible to remove a portion or all of the aqueous phosphoric acid solution discharged from the purification battery or a portion of the aqueous phosphoric acid solution in a middle stage of the extraction battery, and then to mix it with a solvent in the impurity stripping battery. The remaining or all of the aqueous phosphoric acid solution discharged from the purification battery is recycled to the extraction battery.

Whether or not it is preferable to remove the aqueous phosphoric acid solution containing a high zinc concentration from the extraction battery or the purification battery depends upon the type of solvent and the concentration of chloride ions in the extraction battery or the purification battery. For example, when an aliphatic alcohol is used as the solvent and the extraction is conducted in the presence of a relatively low concentration of chloride ions, the concentration of zinc compound in the extraction battery is greater than that of the purification battery. Thus, it is suitable to remove the aqueous phosphoric acid solution from the extraction battery. On the other hand, when a trialkyl phosphate is used as the solvent, and the extraction is conducted in the presence of a relatively high concentration of chloride ions, it is suitable to remove the aqueous phosphoric acid solution from the purification battery for the removal of zinc.

When the amount of the aqueous phosphoric acid solution added to the impurity stripping battery is greater than 3% by volume compared to the flow of the aqueous phase in the zone from which the aqueous solution is removed, the zinc compound will not concentrate and accumulate in the extraction battery or the purification battery in amounts sufficient to contaminate the extracted $H_3PO_4$-solvent mixture with the zinc compound. The solvent used in the impurity stripping battery, can be the same as the solvent used in the extraction battery. A suitable amount of solvent employed in 1 - 30 times by volume the aqueous phosphoric acid solution used in the impurity stripping battery.

The extractor for the impurity stripping battery can be any type of extractor, and is preferably a counter current multi-stage extractor containing 1 - 20 stages, or the corresponding extraction tower. The solvent phase discharged from the impurity stripping battery consists of the solvent and phosphoric acid, and is preferably recycled to a middle stage of extraction battery. The aqueous solution containing a high concentration of zinc compound is exhausted.

Without employing the impurity stripping battery, it is possible to recycle all of the aqueous phosphoric acid solution discharged from the purification battery to the extraction battery. It is possible to remove a portion of the solvent phase of the extraction battery or the purification battery and recycle it to the solvent phase in the upper stage of the extraction battery. The zinc compounds are transferred to the aqueous solution phase in the upper stage and is exhausted with the residual aqueous acid solution from the extraction battery so that concentration and accumulation of the zinc compound can be prevented. It is preferable to remove the solvent phase containing a higher concentration of zinc compounds in the same manner as that of the zinc stripping battery. The amount of the solvent phase recycled to the upper stream in the extraction battery is preferably 1.5 - 15% by volume compared to the total amount of solvent phase in the portion removed. The inlet portion of the solvent phase removed, is especially preferable to be around the outlet stage of the residual aqueous acid solution or the supply stage of the hydrochloric acid.

Having generally described the invention, a more complete understanding can be attained by reference to certain specific examples which are provided herein for purpose of illustration only and are not intended to be limiting unless otherwise specified.

EXAMPLE 1

In a phosphoric acid purification system comprising an extraction battery, a purification battery, a washing (recovering) battery and an impurity stripping battery, 30 parts of an aqueous phosphoric acid solution prepared by a wet process method which contains impurities and 70% of the total aqueous phosphoric acid solution discharged from the purification battery, was added to the 16th mixer-settler of the extraction battery. 210-parts of a water saturated n-butanol solution from the back-extraction of phosphoric acid from the $H_3PO_4$-solvent mixture with water was admitted to the first mixer-settler together with a 35% aqueous hydrochloric acid solution. The n-butanol solution discharged from the impurity stripping battery was conducted to the 8th mixer-settler.

The amount of 35% aqueous hydrochloric acid solution was controlled so that the concentration of chloride ions was 1.5 – 3.5 g/l in the $H_3PO_4$-solvent mixture and the extraction of phosphoric acid by the n-butanol was counter-currently conducted using 16 mixer-settlers. In the purification battery having 20 mixer-settlers, the $H_3PO_4$-solvent mixture discharged from the extraction battery, was counter-currently mixed with an aqueous phosphoric acid solution obtained by back-extracting the $H_3PO_4$-solvent mixture discharged from the purification battery. In the washing (recovering) battery having 10 mixer-settlers, the $H_3PO_4$-solvent mixture was counter-currently mixed with 60 parts of pure water, so that 87.5 parts of an aqueous phosphoric acid solution containing 19.5% $P_2O_5$ and 6 g/l $Cl^-$ was obtained together with a water saturated n-butanol solution. 210-parts of the water saturated n-butanol was recycled to the extraction battery. In the impurity stripping having 5 mixer-settlers, the remaining water saturated n-butanol solution was mixed with 30% by volume of the total aqueous phosphoric acid solution discharged from the purification battery. The resulting phosphoric acid solution containing n-butanol was recycled to the extraction battery. A portion of the 19.5% aqueous phosphoric acid solution was recycled to the purification battery. The remainder was concentrated by heating to remove hydrochloric acid, and to yield 12.5 parts of the following pure phosphoric acid solution containing 61.5% $P_2O_5$ in a normal operation. The yield of the phosphoric acid was 97%.

|  | Crude phosphoric acid (wet method) | Purified phosphoric acid |  |
|---|---|---|---|
| $P_2O_5$ | 33% | 61.5% |  |
| Zn | 200 ppm. | 0.2 | ppm. |
| Cd | 2 ppm. | 0.01 | ppm. |
| Ca | 5,200 ppm. | 3 | ppm. |
| Fe | 1,600 ppm. | 2 | ppm. |
| Al | 2,500 ppm. | 3 | ppm. |

EXAMPLE 2

The crude phosphoric acid was purified in the same manner as described in Example 1 with the exception of the following steps. The amount of 35% aqueous hydrochloric acid solution added to the extraction battery was decreased so as to reduce the concentration of chloride ions in the $H_3PO_4$-solvent to 0.2 – 1.5 g/l. The impurity stripping battery was not used and 20 parts of the solvent phase in the 10th mixer-settler of the extraction battery was recycled to the 1st mixer-settler of the extraction battery. All of the aqueous phosphoric acid solution discharged from the purification battery was recycled to the extraction battery. On the other hand, all of the water saturated n-butanol solution produced by extracting phosphoric acid from the $H_3PO_4$-solvent mixture discharged from the purification battery as a water back extraction was recycled to the extraction battery. A 26% by volume quantity of the aqueous phosphoric acid solution containing 19.5% $P_2O_5$ and 3 g/l $Cl^-$ ion produced by back-extracting the $H_3PO_4$-solvent mixture discharged from the purification battery was recycled to the purification battery. The remaining aqueous phosphoric acid solution was concentrated by heating to remove hydrochloric acid so that the following pure phosphoric acid containing 61.5% of $P_2O_5$ was obtained in a normal operation. The yield of phosphoric acid was 96.9%.

|  | Purfied phosphoric acid | |
|---|---|---|
| $P_2O_5$ | 61.5% | |
| Zn | 0.2 | ppm. |
| Cd | 0.01 | ppm. |
| Ca | 2 | ppm. |
| Fe | 2 | ppm. |
| Al | 2 | ppm. |

EXAMPLE 3

The crude phosphoric acid was purified in the same manner as described in Example 1 with the exception of the following steps.

Isoamyl alcohol was used as the organic solvent and the amount of 35% aqueous hydrochloric acid solution added to the extraction battery was controlled so as to maintain a chloride ion concentration of 0.2 – 1.5 g/l in the $H_3PO_4$-solvent mixture discharged from the extraction battery. 300 parts of the water saturated isoamyl alcohol solution produced by back-extracting phosphoric acid from the $H_3PO_4$-solvent solution discharged from the purification battery with water, was recycled to the extraction battery. The remaining water saturated isoamyl alcohol solution was admitted to the impurity stripping battery. A 6% by volume amount of the aqueous solution discharged from the 10th mixer-settler of the extraction battery was removed and was supplied to the impurity stripping battery. All of the aqueous phosphoric acid solution discharged from the purification battery was recycled to the extraction battery. 30 parts of the aqueous phosphoric acid solution containing 19.5% $P_2O_5$ and 16 g/l $Cl^-$ ion was admitted to the purification battery. The aqueous phosphoric acid solution containing 18% $P_2O_5$ and 5.2 g/l $Cl^-$ ion produced by back-extracting the $H_3PO_4$-solvent mixture discharged from the purification battery with water, was concentrated by heating to remove hydrochloric acid. The following pure phosphoric acid containing 61.4% in a normal condition was obtained. The yield of phosphoric acid was 97%.

|  | Purified phosphoric acid | |
|---|---|---|
| $P_2O_5$ | 61.4% | |
| Zn | 0.2 | ppm. |
| Cd | 0.01 | ppm. |
| Ca | 2 | ppm. |
| Fe | 2 | ppm. |
| Al | 3 | ppm. |

EXAMPLE 4

The crude phosphoric acid was purified in the same manner as described in Example 1 with the exception of the following steps. Tributyl phosphate was used as the organic solvent and the amount of 35% aqueous hydrochloric acid solution added to the extraction battery was controlled so as to maintain a chloride ion concentration of 6 – 10 g/l in the $H_3PO_4$-solvent mixture discharged from the extraction battery. In the purification battery having 30 countercurrent mixer-settlers, 40 parts of the aqueous phosphoric acid solution containing 20% P$_2$O$_5$ and no hydrochloric acid was admitted. All of the aqueous phosphoric acid solution discharged from the purification battery was recycled to the extraction battery. A 10% by volume amount of the aqueous solution was removed from the 4th mixer-settler from the outlet of the aqueous phosphoric acid solution in the purification battery, and was admitted to the impurity stripping battery.

All of the aqueous phosphoric acid solution containing 23.2% P$_2$O$_5$ and 0.3 g/l Cl$^-$ ion produced by back-extracting the phosphoric acid-solvent discharged from the purification battery was concentrated by heating to remove hydrochloric acid. Pure phosphoric acid containing 61.5% P$_2$O$_5$ and of the same composition indicated in Example 1 was obtained. The yield of phosphoric acid was 97.1%.

EXAMPLE 5

The crude phosphoric acid was purified in the same manner as described in Example 4 with the exception of the following steps. The impurity stripping battery was not provided. A 10% by volume amount of the solvent phase was removed from the 4th mixer-settler from the outlet of the aqueous phosphoric acid solution, and was recycled to the 1st mixer-settler of the extraction battery. All of the phosphoric acid containing 23.1% P$_2$O$_5$ and 0.4 g/l Cl$^-$ ion produced by back-extracting the H$_3$PO$_4$-solvent mixture with water, was concentrated by heating to remove hydrochloric acid. Pure phosphoric acid containing 61.5% of P$_2$O$_4$ and of the same composition indicated in Example 4 was obtained. The yield of phosphoric acid was 96.9%.

Having now fully described the invention, it will be apparant to one of ordinary skill in the art that many changes and modifications can be made thereto without departing from the spirit or scope of the invention as set forth herein.

What is claimed as new and desired to be secured by Letters Patent of the United States is:

1. A process for purifying a phosphoric acid solution containing zinc compound impurities obtained by a wet process method, which comprises:

extracting crude phosphoric acid with a solvent having limited water solubility selected from the group consisting of aliphatic alcohols, alkylphosphates, ketones, esters and ethers so as to obtain a phosphoric acid-containing solvent phase containing 0.2 – 10 g/l of chloride ion and an aqueous phosphoric acid solution;

controlling the chloride ion concentration in said phosphoric acidcontaining solvent phase to less than 10 g/l by adding chloride ion thereto:

purifying the phosphoric acid-containing solvent phase with a second aqueous phosphoric acid solution characterized by a chloride ion concentration of 20 – 0.01 g/l in amounts such that the amount of aqueous phosphoric acid solution is 0.03 – 0.3 times the amount of phosphoric acid -containing solvent solution so as to substantially transfer the zinc compound impurities from the solvent phase to the aqueous phosphoric acid solution;

washing the phosphoric acid from the resulting solvent phase in the purification step with water so as to obtain a purified phosphoric acid; and removing zinc compound impurities by withdrawing said aqueous phosphoric acid solution of the extraction step.

2. The process of claim 1, which further comprises removing the zinc compound inpurities by withdrawing said aqueous phosphoric acid solution from the purification step.

3. The process of claim 1, which further comprises stripping the aqueous phosphoric acid solution containing the zinc compound impurities which issues from said purification step with a solvent having limited water solubility.

4. The process according to claim 1, wherein said extraction step and said purification step are conducted by mixing the solvent and aqueous phosphoric acid phases and then allowing them to settle.

5. The process according to claim 1, wherein said extraction step and said purification step is conducted by passing said aqueous and solvent phosphoric acid phases through a tower containing a plurality of perforated plates.

6. The process according to claim 1, wherein a part of the phosphoric acid containing solvent phase is recycled to an the extraction step in order to transfer zinc compounds to the aqueous phosphoric acid solution exhausted.

7. The process according to claim 1 wherein the crude phosphoric acid solution is combined with the phosphoric acid containing solvent phase and extracted in the extraction step, the residual aqueous acid solution is exhausted from the extraction step, and the solvent discharged from the stripping step is supplied to of the extraction step.

8. The process according to claim 1, wherein a solvent in amounts of 0.5 – 50 times by volume the amount of the crude phosphoric acid is supplied to the extraction step.

9. The process according to claim 1, wherein pure phosphoric acid containing 10 – 45% by weight of P$_2$O$_5$ is contacted with the phosphoric acid containing solvent phase wherein the amount of the aqueous phase is 0.03 – 0.3 times by volume the amount of the solvent phase in the purification step.

10. The process according to claim 1, wherein the solvent having limited water solubility is selected from the group consisting of cyclohexanol, isoamylalcohol, n-butanol, isobutanol and trialkylphosphate.

* * * * *